United States Patent
Rodriguez Bravo et al.

(10) Patent No.: US 12,106,663 B2
(45) Date of Patent: Oct. 1, 2024

(54) AUTONOMOUS VEHICLE MANAGEMENT BASED ON OBJECT DETECTION

(71) Applicant: INTERNATIONAL BUSINESS MACHINES CORPORATION, Armonk, NY (US)

(72) Inventors: Cesar Augusto Rodriguez Bravo, Alajuela (CR); Shikhar Kwatra, San Jose, CA (US); Sarbajit K. Rakshit, Kolkata (IN); Jeremy R. Fox, Georgetown, TX (US); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 647 days.

(21) Appl. No.: 17/008,685

(22) Filed: Sep. 1, 2020

(65) Prior Publication Data

US 2022/0068125 A1    Mar. 3, 2022

(51) Int. Cl.
| | |
|---|---|
| *G08G 1/01* | (2006.01) |
| *G06N 20/00* | (2019.01) |
| *G08G 1/00* | (2006.01) |
| *G08G 1/09* | (2006.01) |
| *G08G 1/0967* | (2006.01) |

(52) U.S. Cl.
CPC ........... *G08G 1/0145* (2013.01); *G06N 20/00* (2019.01); *G08G 1/0112* (2013.01); *G08G 1/096791* (2013.01); *G08G 1/22* (2013.01)

(58) Field of Classification Search
CPC ............... G08G 1/0145; G08G 1/0112; G08G 1/096791; G08G 1/22; G08G 1/096725; G08G 1/162; G06N 20/00; G01S 2013/9316
See application file for complete search history.

(56) References Cited

U.S. PATENT DOCUMENTS

| | | |
|---|---|---|
| 8,660,734 B2 | 2/2014 | Zhu |
| 9,481,367 B1 | 11/2016 | Gordon |
| 9,805,598 B2 | 10/2017 | Ishikawa |
| 10,050,760 B2 | 8/2018 | Ross |
| 10,156,848 B1 * | 12/2018 | Konrardy ................. G08G 1/20 |

(Continued)

OTHER PUBLICATIONS

Accident Solicitors Direct, "Road Traffic Accidents Caused by Animals: Your Complete Guide," [accessed on Jun. 6, 2020], ASDOnline, 8 pages, Retrieved from the Internet: <URL: https://www.asdonline.co.uk/advice-centre/road-traffic-accidents-caused-by-animals-your-complete-guide>.

(Continued)

*Primary Examiner* — Adam D Tissot
(74) *Attorney, Agent, or Firm* — Elliot J Shine (57) ABSTRACT

A method, computer system, and a computer program product for vehicle collaboration is provided. The present invention may include receiving data about a detection in a road. The present invention may include gathering additional data based on the received data. The present invention may include determining a comparative priority of at least one available vehicle. The present invention may include forming a protective layer using the at least one available vehicle. The present invention may include determining a structured movement path. The present invention may include retraining a machine learning model.

20 Claims, 5 Drawing Sheets

(56) References Cited

U.S. PATENT DOCUMENTS

| | | | |
|---|---|---|---|
| 10,692,377 B1* | 6/2020 | Kentley-Klay | G05D 1/0011 |
| 2014/0214618 A1 | 7/2014 | Pedley | |
| 2017/0178505 A1* | 6/2017 | Ishikawa | G08G 1/09 |
| 2017/0202185 A1 | 7/2017 | Trumbull | |
| 2017/0276492 A1* | 9/2017 | Ramasamy | G08G 1/096775 |
| 2018/0027772 A1 | 2/2018 | Gordon | |
| 2018/0074499 A1 | 3/2018 | Cantrell | |
| 2019/0049960 A1 | 2/2019 | Battles | |
| 2019/0049994 A1* | 2/2019 | Pohl | G08G 1/166 |
| 2020/0192603 A1* | 6/2020 | Tanriover | G06F 3/0659 |
| 2020/0249683 A1* | 8/2020 | Rosales | G08G 1/164 |
| 2020/0269875 A1* | 8/2020 | Wray | G08G 1/164 |

OTHER PUBLICATIONS

Aedo, et al., "Personalized Alert Notifications and Evacuation Routes in Indoor Environments," Sensors, 2012; pp. 7804-7827, vol. 12, DOI: 10.3390/sl20607804, Retrieved from the Internet: <URL: www.mdpi.com/journal/sensors>.

Darac, "Emergency Evacuation Planning Guide for People with Disabilities," National Fire Protection Association, Guidebook [online], Jun. 2016, National Fire Protection Association, 69 pages, Retrieved from the Internet: <URL: https://www.in.gov/isdh/files/Emergency_Evacuation_Planning_Guide_for_People_with_Disabilities.pdf>.

Mell, et al., "The NIST Definition of Cloud Computing", National Institute of Standards and Technology, Special Publication 800-145, Sep. 2011, 7 pages.

Osha, "Evacuation & Shelter-in-Place," United States Department of Labor, [accessed on Aug. 10, 2020], 13 pages, Retrieved from the Internet: <URL: https://www.osha.gov/SLTC/emergencypreparedness/gettingstarted_evacuation.html>.

RCS, "We're here to help you with your Road Traffic Accident Injury Claim Road Traffic Accident Involving An Animal," [accessed on Jun. 9, 2020], RCSolicitors.co, 6 pages, Retrieved from the Internet: <URL: https://www.rcsolicitors.co.uk/personal-injury/road-traffic-accident/accident-caused-by-an-animal>.

* cited by examiner

AUTONOMOUS VEHICLE MANAGEMENT BASED ON OBJECT DETECTION

BACKGROUND

The present invention relates generally to the field of computing, and more particularly to autonomous vehicle systems.

Object detection and collaboration between vehicles may play an important role in the advancement of safe driving as roads begin to incorporate more autonomous vehicles. Autonomous vehicles may be equipped with a variety of vehicle sensors: a camera, a radar, sonar, a Global Positioning System (GPS), odometry, an Internal Measurement Unit (IMU) and a LiDAR. Together, the variety of vehicle sensors may provide the autonomous vehicle with visuals of the vehicle's surroundings and may facilitate detection of both the speed and distance of nearby objects, as well as three-dimensional shapes.

The ability of autonomous vehicles to make these detections and to communicate between vehicles may promote both human and animal safety. An autonomous vehicle may refer to any vehicle capable to undertake an action not directly attributable to a driver.

SUMMARY

Embodiments of the present invention disclose a method, computer system, and a computer program product for vehicle collaboration. The present invention may include receiving data about a detection in a road. The present invention may include gathering additional data based on the received data. The present invention may include determining a comparative priority of at least one available vehicle. The present invention may include forming a protective layer using the at least one available vehicle. The present invention may include determining a structured movement path. The present invention may include retraining a machine learning model.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for vehicle collaboration. As such, the present embodiment has the capacity to improve the technical field of autonomous vehicle systems by detecting road patterns and by suggesting structured movement paths based on learned patterns. More specifically, the present invention may include receiving data about a detection in a road. The present invention may include gathering additional data based on the received data. The present invention may include determining a comparative priority of at least one available vehicle. The present invention may include forming a protective layer using the at least one available vehicle. The present invention may include determining a structured movement path. The present invention may include retraining a machine learning model.

As previously described, object detection and collaboration between vehicles may play an important role in the advancement of safe driving as roads begin to incorporate more autonomous vehicles. Autonomous vehicles may be equipped with a variety of vehicle sensors: a camera, a radar, sonar, a Global Positioning System (GPS), odometry, an Internal Measurement Unit (IMU) and a LiDAR. Together, the variety of vehicle sensors may provide the autonomous vehicle with visuals of the vehicle's surroundings and may facilitate detection of both the speed and distance of nearby objects, as well as three-dimensional shapes.

The ability of autonomous vehicles to make these detections and to communicate between vehicles may promote both human and animal safety. An autonomous vehicle may refer to any vehicle capable to undertake an action not directly attributable to a driver (e.g., semi-automated vehicles). For example, a vehicle equipped with vehicle assist systems (Automatic Emergency Breaking (AEB), Automatic Parking, Lane-keep assist, lane-centering assist (LCA), adaptive cruise control (ACC)) may be considered an autonomous vehicle for purposes of this invention.

Therefore, it may be advantageous to, among other things, receive data about a detection in a road. Gather additional data based on the received data. Determine a comparative priority of at least one available vehicle. Form a protective layer using at least one available vehicle. Determine a structured movement path. Retrain the model.

According to at least one embodiment, the present invention may improve vehicle collaboration between autonomous vehicle systems by receiving data about a detection in a road and gathering additional data based on the received data.

Received data may be analyzed and leveraged in order to gather additional data based on the received data. Received data may include, but is not limited to including, the size of the detection in the road, the number of the detections in the road, the location and/or direction of the detections in the road, whether the detection in the road is moving or stationary, the speed of the detections in the road, and/or the species of animal, if applicable, among other things. The received data may include a High Definition Map captured by an autonomous vehicle.

Additional data may include, but is not limited to including, species migration patterns, events scheduled on social media, weather data, weather patterns, storm patterns, traffic patterns, construction data, farm locations, and/or car accident data, among other things.

According to at least one embodiment, the present invention may communicate the data received about the detection in the road to other autonomous vehicles.

According to at least one embodiment, the present invention may include determining a comparative priority of at least one available vehicle (e.g., vehicles which may form the protective layer).

The comparative priority (e.g., critical, high, medium, low, none) of at least one available vehicle may consider a multitude of factors, including but not limited to, the type of vehicle (e.g., Uber® (Uber is a registered trademark of Uber Technologies, Inc. in the United States and/or other countries), ambulance, police car, passenger vehicle, no passenger vehicle), the importance of the vehicle's destination (e.g., whether the vehicle is traveling to an airport, a hospital, a crime scene, a work location, a home, and/or a sight-seeing location), and/or a vehicle's participation history.

According to at least one embodiment, the present invention may determine a number of necessary vehicles (e.g., number of vehicles necessary to form a protective layer) based on a machine learning model to form a protective layer. The machine learning model may utilize received data, additional data, and/or a historical data analysis (e.g., database 114) to determine the number of necessary vehicles (e.g., number of vehicles necessary to form a protective layer) to form the protective layer.

The protective layer may be a protective formation comprised of a group of vehicles (e.g., autonomous, non-autonomous) separating the detection (e.g., an object, garbage, debris, a branch, stopped vehicle, boulders, cargo, a single animal, a herd of animals, a person, and/or a group of people, among other things) from a secure lane, wherein the secure lane is a lane in which a vehicle can travel without compromising speed. The protective layer may be comprised of the number of necessary vehicles determined by the machine learning model. The necessary vehicles that make up the protective layer may be referred to as participating vehicles. Participating vehicles may be replaced by approaching available vehicles.

According to at least one embodiment, the present invention may include determining a structured movement path. The structured movement path may be a gradual movement of the protective layer from a busy area to a less busy area (e.g., from the left lane of a roadway to the right lane of a roadway).

According to at least one embodiment, the present invention may include retraining the machine learning model.

Figure 1:
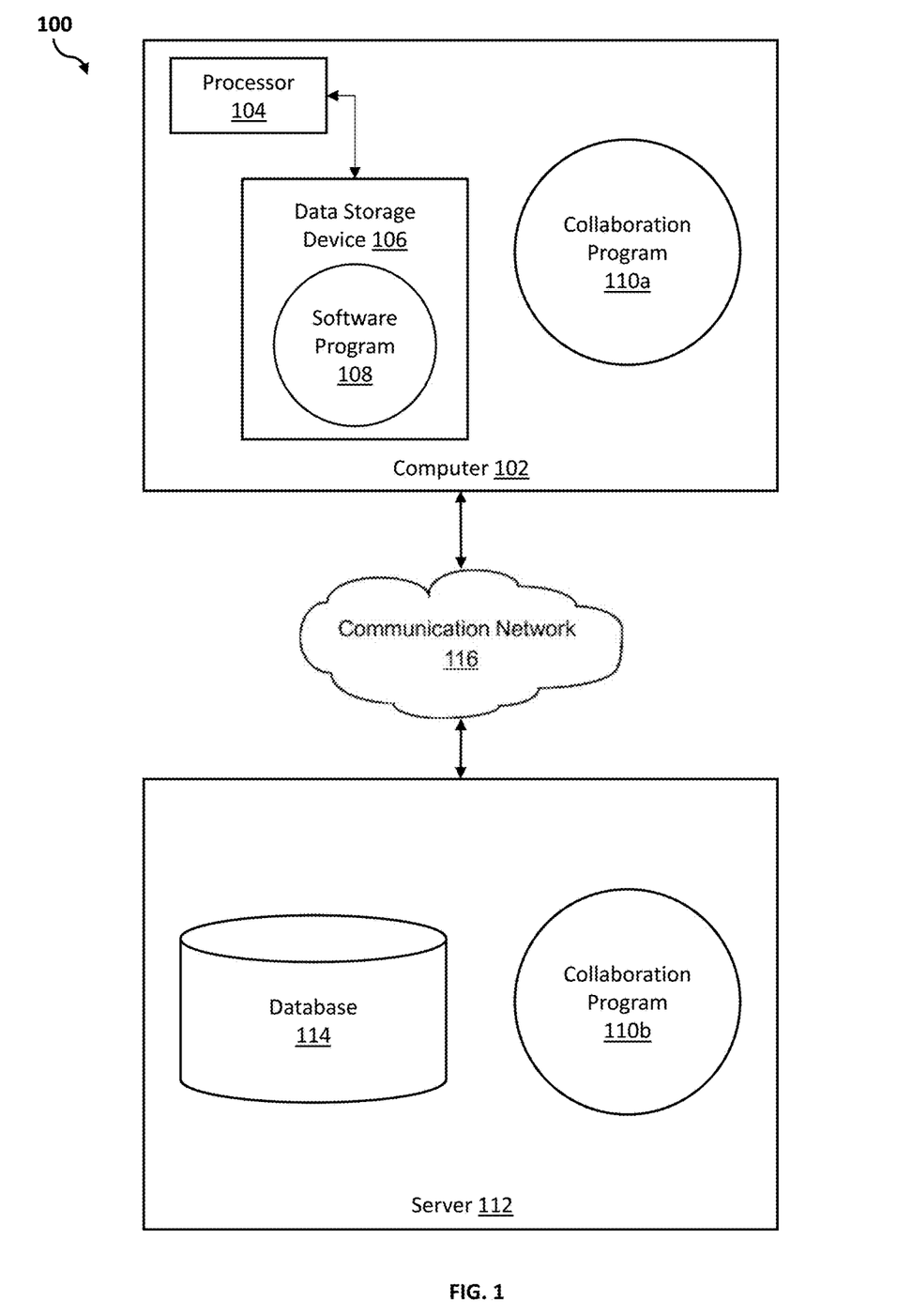
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a collaboration program 110a. The networked computer environment 100 may also include a server 112 that is enabled to run a collaboration program 110b that may interact with a database 114 (e.g., a historical data analysis) and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. Client computer 102 may be located within a vehicle. Client computer 102 may be connected to a control system (e.g., Advanced Vehicle Control Systems (AVCS), Adaptive Cruise Control (SCC), Lane Keeping Assistance (LKA)) of a vehicle. According to various implementations of the present embodiment, the collaboration program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the collaboration program 110a, 110b (respectively) to determine a structured movement path of vehicles (e.g., autonomous, non-autonomous) based on received data, additional data, and the historical data analysis (e.g., database 114). The vehicle collaboration method is explained in more detail below with respect to FIG. 2.

Figure 2:
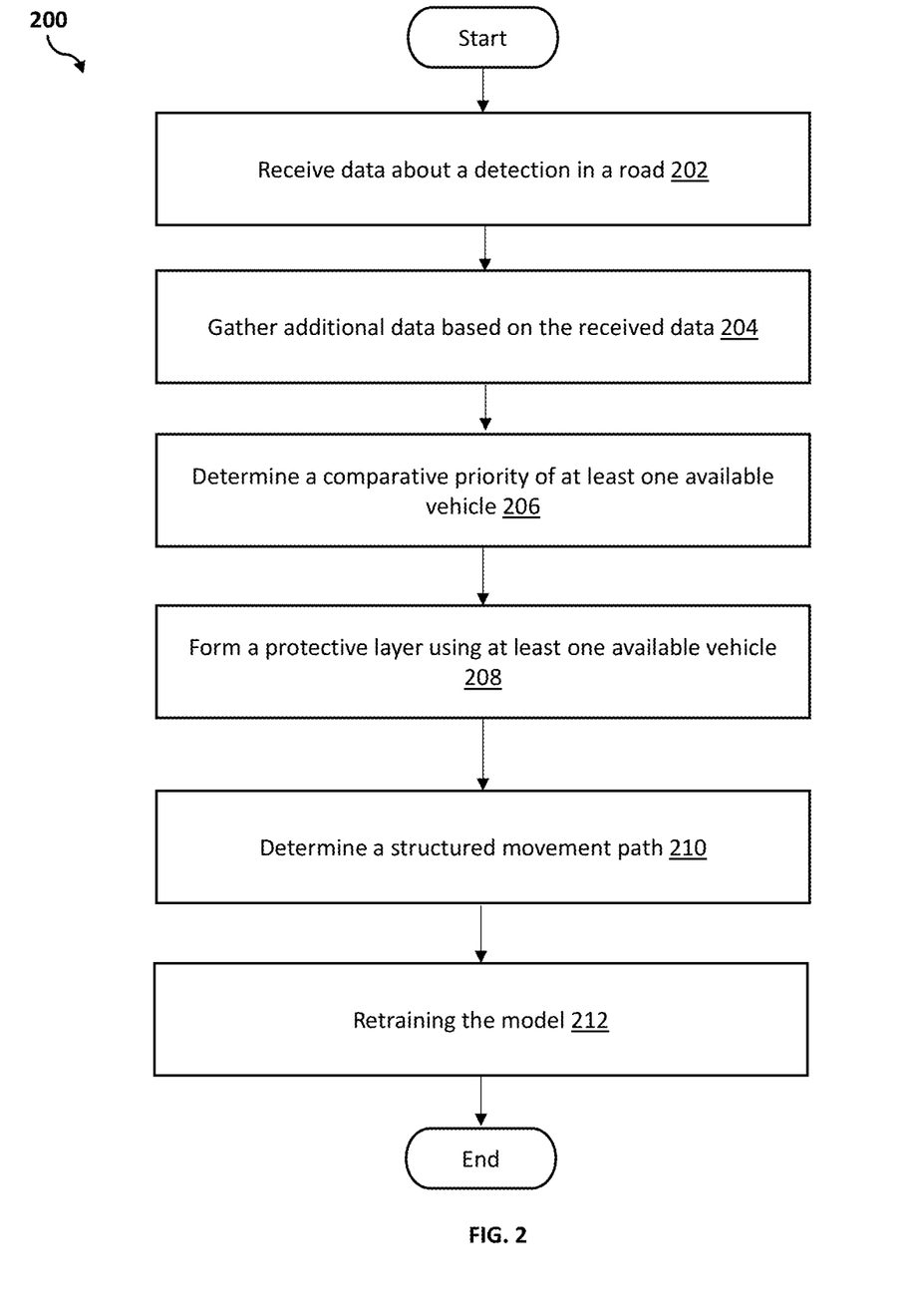
FIG. 2 is an operational flowchart illustrating a process for vehicle collaboration according to at least one embodiment.

Referring now to FIG. 2, an operational flowchart illustrating the exemplary vehicle collaboration process 200 used by the collaboration program 110a and 110b (hereinafter referred to as the collaboration program 110) according to at least one embodiment is depicted.

At 202, the collaboration program 110 receives data about a detection in a road. The collaboration program 110 may receive data about the detection in the road from an autonomous vehicle. The collaboration program 110 may receive data about the detection in the road from a user (e.g., an operator of a non-autonomous vehicle, a passenger in a non-autonomous vehicle, and/or a person observing the object in the roadway, among other things). The user may utilize a mobile version of the collaboration program 110 which can be accessed via a web browser and/or a mobile application, among other things.

The detection may include, but is not limited to including, an object, garbage, debris, a branch, a stopped vehicle, boulders, cargo, a single animal, a herd of animals, a person, and/or a group of people, among other things. The data received (e.g., received data) by the collaboration program 110 may include, but is not limited to including, the size of the detection in the road, the number of the detections in the road, the location and/or direction of the detections in the road, whether the detection in the road is moving or stationary, the speed of the detections in the road, and/or the species of animal, if applicable, among other things.

The detection in the road may have been performed by an autonomous vehicle through one of the autonomous vehicle's sensors (e.g., a camera, a radar, and/or a LiDAR). The collaboration program 110 may communicate the data received about the detection in the road to other autonomous vehicles. The collaboration program 110 may communicate the data received about the detection in the road to the user (e.g., an operator of a non-autonomous vehicle, a passenger in a non-autonomous vehicle, and/or a person observing the object in the roadway, among other things) of the mobile version of the collaboration program 110.

The collaboration program 110 may utilize car-to-car communication and/or car-to-infrastructure communication (e.g., cloud) to communicate the data received about the detection in the road to other autonomous vehicles. The autonomous vehicle may capture High Definition Maps following the detection. The collaboration program 110 may receive the captured High Definition Maps from the autonomous vehicle.

High Definition Maps may be built for self-driving purposes, having extremely high precision at a centimeter-level. A combination of sensors (e.g., cameras, LiDAR, Global Positioning System (GPS), Internal Measurement Unit (IMU), sonar, odometry, and radars) may be used during the creation and updating of High Definition Maps.

The detection in the road may be performed by the user (e.g., an operator of a non-autonomous vehicle, a passenger in a non-autonomous vehicle, and/or a person observing the object in the roadway, among other things). The user may use a mobile version of the collaboration program 110 which can be accessed via a web browser and/or a mobile application, among other things. The collaboration program 110 may communicate the data received about the detection in the road to other users of the collaboration program 110 (e.g., through a web-based application, among other things). The collaboration program 110 may communicate the data received about the detection performed by the user to autonomous vehicles.

The collaboration program 110 may receive images or video from the user via the web-based application (e.g., via a web browser and/or a mobile application). The collaboration program 110 may track the location of the user via the web-based application.

The user may contribute to the collaboration program 110 by enrolling and/or opting in (e.g., by buying an autonomous vehicle and/or by downloading a mobile application, among other things).

The collaboration program 110 may also track a participation history of the user. The collaboration program 110 may also track the participation history of an autonomous vehicle. The participation history may include, but is not limited to including, an amount of times an autonomous vehicle has participated in a protective layer (as will be described in more detail with respect to step 208 below), an amount of times the autonomous vehicle has opted out of participating in a protective layer, an amount of times a user of a web-based collaboration program 110 has participated in the protective layer, and/or the amount of times a user of a web-based collaboration program 110 has opted out of participating in the protective layer.

The collaboration program 110 may award incentives based on the participation history. For example, the collaboration program 110 may provide a token (e.g., a free pass) that allows a vehicle to opt out of participating in the protective layer.

At 204, the collaboration program 110 gathers additional data based on the received data. The additional data may include, but is not limited to including, species migration patterns, events scheduled on social media, weather data, weather patterns, storm patterns, traffic patterns, construction data, farm locations, and/or car accident data, among other things. The collaboration program 110 may gather the additional data from a plurality of sources, which sources may include, but are not limited to including, the Internet, Facebook® (Facebook is a registered trademark of Facebook, Inc. in the United States and/or other countries), news sources, Twitter® (Twitter is a registered trademark of Twitter, Inc. in the United States and/or other countries), National Highway Traffic Safety Administration, The International Road Traffic and Accident Database, The Fatality Analysis Reporting System dataset, U.S. Department of Transportation/Bureau of Transportation Statistics, National Transportation Atlas Database, California Roadkill Observation System, Wildlife Roadkill Database, National Geographic Society® (National Geographic Society is a registered trademark of the National Geographic Society Corporation in the United States and/or other countries), The Nature Conservancy® (The Nature Conservancy is a registered trademark of The Nature Conservancy in the United States).

The collaboration program 110 may also gather additional data after performing image processing, image recognition, word processing, and/or word recognition.

For example, the collaboration program 110 may receive an image, via a web-based application, from a user. The collaboration program 110 may determine the detection is a group of people protesting in the road. The collaboration program 110 may track the location of the user and may then gather additional data based on the received data (e.g., based on the location of the user, a determined time of day/month/year, among other things). The collaboration program 110 may also search connected social media accounts, including but not limited to Facebook® (Facebook is a registered trademark of Facebook, Inc. in the United States and/or other countries), for an event relating to the protest which may indicate an amount of people registered for the protest, and/or the destination of the protest, among other things.

The collaboration program 110 may utilize a historical data analysis (e.g., database 114), which may include, but is not limited to including, data previously received from an autonomous vehicle, High Definition Maps previously received from an autonomous vehicle, data previously received from a user of a web-based and/or mobile application, images or videos previously received from a user of the web-based application and/or mobile application, additional data previously gathered by the collaboration program 110, data about the area of the road where the detection was made, reports of animals moving through the area of the road where the detection was made, events found on connected social media accounts, known movement patterns between any two specified points, previous detection reports by users, previous detection reports by autonomous vehicles, time of day of previous detections in the area, and/or farms in the area, among other things.

The collaboration program 110 may utilize the historical data analysis (e.g., database 114) for storing received data (e.g., detections made by an autonomous vehicle and/or a mobile or web-based application), for storing additional data (e.g., data gathered based on the received data), and/or for storing previous approaches (e.g., number of necessary vehicles for previous similar detections, protective layer formations for previous similar detections, structured movement paths for previous similar detections) to in-road detections.

The collaboration program 110 may utilize the historical data analysis (e.g., database 114) to gather data on previous similar detections.

For example, if the collaboration program 110 receives data that the detection (e.g., a herd of cows) is in a location the collaboration program 110 has received data about previously, then the collaboration program 110 may utilize the historical data analysis (e.g., database 114) to gather additional data about the detection. The collaboration program 110 may utilize previous received and gathered data in determining an approach (e.g., number of necessary vehicles, protective layer formations, structured movement path) for the detection in the road.

The collaboration program 110 may utilize the historical data analysis (e.g., database 114) to send notifications to vehicles approaching an area (e.g., advisory notices to slow down and/or to proceed with caution, to avoid traveling during certain times, to avoid certain routes during predicted animal movement(s), to travel at a recommended speed, and/or to take an alternative route, among other things).

For example, the collaboration program 110 may recognize patterns in the received data and the additional data and may determine that a particular part of a road should not be traveled at night.

The collaboration program 110 may automatically slow autonomous vehicles entering a road portion determined to be dangerous.

The collaboration program 110 may recommend warnings (e.g., road signs) based on the historical data analysis.

At 206, the collaboration program 110 determines a comparative priority of at least one available vehicle. The comparative priority may be a determination of which of at least one available vehicle (e.g., non-emergency vehicle, a vehicle without a free pass or token, a vehicle that has a medium, low, or no priority) may be utilized to form a protective layer.

The comparative priority may utilize a determined priority (e.g., critical, high, medium, low, none) in determining which of at least one available vehicle (e.g., non-emergency vehicle, a vehicle without a free pass or token, a vehicle that has a medium, low, or none priority) may be utilized to form the protective layer. The comparative priority may be a ranking (e.g., first vehicle to be used in the protective layer to last vehicle to be used in the protective layer) of the at least one available vehicle to be utilized in forming the protective layer.

The determined priority may be based on a multitude of factors, including but not limited to, the type of vehicle, such as, Uber® (Uber is a registered trademark of Uber Technologies, Inc. in the United States and/or other countries), ambulance, police car, passenger vehicle, no passenger vehicle; the importance of the vehicle's destination, including travel to an airport, hospital, crime scene, work, home, sight-seeing; and/or a vehicle's participation history, among other things.

The determined priority may be configured within the collaboration program 110. The determined priority within the collaboration program 110 may be modified based on user input.

For example, if a vehicle's destination is determined to be a hospital, based on a connected GPS system, then the determined priority of critical may automatically be assigned. However, the user may nevertheless opt into participating in the protective layer ant not using the secure lane based on the fact that there is no imminence to the user's arrival at the hospital.

The collaboration program 110 may utilize the determined comparative priority of at least one available vehicle (e.g., a non-emergency vehicle, a vehicle without a free pass or token, a vehicle that has a medium, low, or noncomparative priority, among other things) to form the protective layer.

For example, if the collaboration program 110 determines that 10 vehicles are necessary to form the protective layer (e.g., necessary vehicles) and there are 3 high priority vehicles, 4 medium priority vehicles, and 6 low priority vehicles, the collaboration program 110 may utilize the 4 medium priority vehicles and 6 low priority vehicles to form the protective layer. In this example the 3 high priority vehicles would be allowed to pass once a secure lane was created (e.g., the high priority vehicles would be part of a structured movement path, as will be described in more detail with respect to step 210 below). Additionally, as more available vehicles approach, available vehicles with similar priority levels may replace a participating vehicle (e.g., vehicle in the protective layer) in the protective layer (e.g., a medium priority vehicle that has been in the protective layer for 3 minutes may be replaced by an approaching medium priority vehicle).

The collaboration program 110 may utilize a connection between autonomous vehicles and non-autonomous vehicles (e.g., non-autonomous vehicles utilizing a mobile and/or web-based application of the collaboration program 110) to ensure that the number of necessary vehicles (e.g., number of vehicles necessary to form a protective layer) is always present.

The collaboration program 110 may utilize car-to-car communication and/or car-to-infrastructure communication (e.g., cloud) to enlist (e.g., recruit autonomous vehicles in the area with low comparative priority to form the protective layer) autonomous vehicles when the number of necessary vehicles is greater than the number of available vehicles. The collaboration program 110 may send alerts to the user of the mobile version of the collaboration program 110 to enlist (e.g., recruit users of the mobile version of the collaboration program 110 in the area to form the protective layer) non-autonomous vehicles when the number of necessary vehicles is greater than the number of available vehicles.

For example, if the collaboration program 110 determines the number of necessary vehicles to form the protective layer is 5 and there are 3 available vehicles with low priority in the area and a vehicle with a critical priority approaching the collaboration program 110 may enlist 2 autonomous vehicles to form the protective layer. The collaboration program 110 may enlist autonomous vehicles heading in a different direction, on a different road, or in the surrounding area.

At 208, the collaboration program 110 forms a protective layer using at least one available vehicle. The collaboration program 110 may determine a number of necessary vehicles to form the protective layer (e.g., a number of vehicles necessary to form a protective layer based on the size and type of detection, among other things). The collaboration program 110 may determine the number of necessary vehicles based on a machine learning model.

The machine learning model may utilize received data, additional data, and/or the historical data analysis (e.g., database 114) in determining the number of necessary vehicles to form the protective layer.

The collaboration program 110 may communicate with approaching vehicles to identify a number of vehicles available to form the protective layer.

The collaboration program 110 may designate a particular path for vehicles to travel. The particular path for vehicles to travel may be separated from the detection in the road by a formation. The particular path for vehicles to travel may be the secured lane. The formation may be comprised of vehicles. The formation comprised of vehicles may be referred to as the protective layer.

The protective layer may be a protective formation comprised of a group of vehicles (e.g., autonomous, non-autonomous) separating the detection (e.g., an object, garbage, debris, a branch, stopped vehicle, boulders, cargo, a single animal, a herd of animals, a person, and/or a group of people, among other things) from a secure lane, wherein the secure lane is a lane in which a vehicle can travel without compromising speed. The protective layer may be comprised of the number of necessary vehicles determined by the machine learning model. The necessary vehicles that make up the protective layer may be referred to as participating vehicles. Participating vehicles may be replaced by approaching available vehicles.

The collaboration program 110 may utilize data based on previous approaches (e.g., a number of necessary vehicles based on a similar sized herd of animals traveling a similar sized road, a comparative effectiveness based on other recommendations, and/or similar characteristics to other detections) in determining the number of necessary vehicles to form the protective layer. The previous approaches may be stored in the historical data analysis (e.g., database 114).

The collaboration program 110 may utilize data received from an autonomous vehicle to determine the number of animals present in the road. The collaboration program 110 may utilize additional data for road characteristics (e.g., size of the road, length of the road, curves in the road, lanes of the road, size of the shoulder of the road, among other things). The collaboration program 110 may further utilize the historical data analysis (e.g., database 114) for the number of vehicles previously used in a protective layer (e.g., for a similar herd of animals, among other things).

At 210, the collaboration program 110 determines a structured movement path. The structured movement path may be a gradual movement of the detection from a dangerous area to a safe area (e.g., the left to right lane) by utilizing the protective layer (as described previously with respect to step 208 above). The structured movement path may be communicated to approaching vehicles.

The structured movement path may include the secure lane (e.g., the lane created by the protective layer for traffic and high priority vehicles which can be traveled without compromising speed).

Autonomous vehicles may utilize ultrasound (e.g., an ultrasound shock module, haptic technology) to dictate the movement of the detection and/or the location of the structured movement path. Autonomous and/or non-autonomous vehicles may further utilize sounds (e.g., honking of a horn) to dictate the movement of the detection and/or the location of the structured movement path.

For example, the structured movement path may include a coordinated effort between protective layer vehicles to move a herd of animals from the left lane of a roadway to the right lane of the roadway where the animals may naturally exit the road altogether. The secure lane may allow an emergency vehicle to pass the herd of animals safely.

At 212, the collaboration program 110 retrains the machine learning model. The collaboration program 110 may retrain the machine learning model based on effectiveness of the structured movement path.

The collaboration program 110 may determine the effectiveness of the structured movement path based on a plurality of factors. The plurality of factors may include, but are not limited to including, the speed of vehicles in the secure lane, the time spent as part of the protective layer by each vehicle, whether any motor vehicle accidents and/or incidents occurred during the movement of the detection, and/or the time spent forming the protective layer, among other things. The effectiveness of the structured movement path may be further based on user feedback entered in the collaboration program 110.

The collaboration program 110 may store the determined effectiveness in the historical data analysis (e.g., database 114). The effectiveness of the structured movement path may be assigned a numerical value. The collaboration program 110 may weigh a plurality of factors (e.g., the speed of vehicles in the secure lane, the time spent as part of the protective layer by each vehicle, and/or the time spent forming the protective layer) in determining the effectiveness of the structured movement path.

For example, if the vehicle speed recorded in the secure lane is close to the speed limit in an area the effectiveness of the structured movement path may receive a score of 9. If the vehicle speed recorded in the secure lane is 5 m.p.h. the effectiveness of the structured movement path may receive a score of 2.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
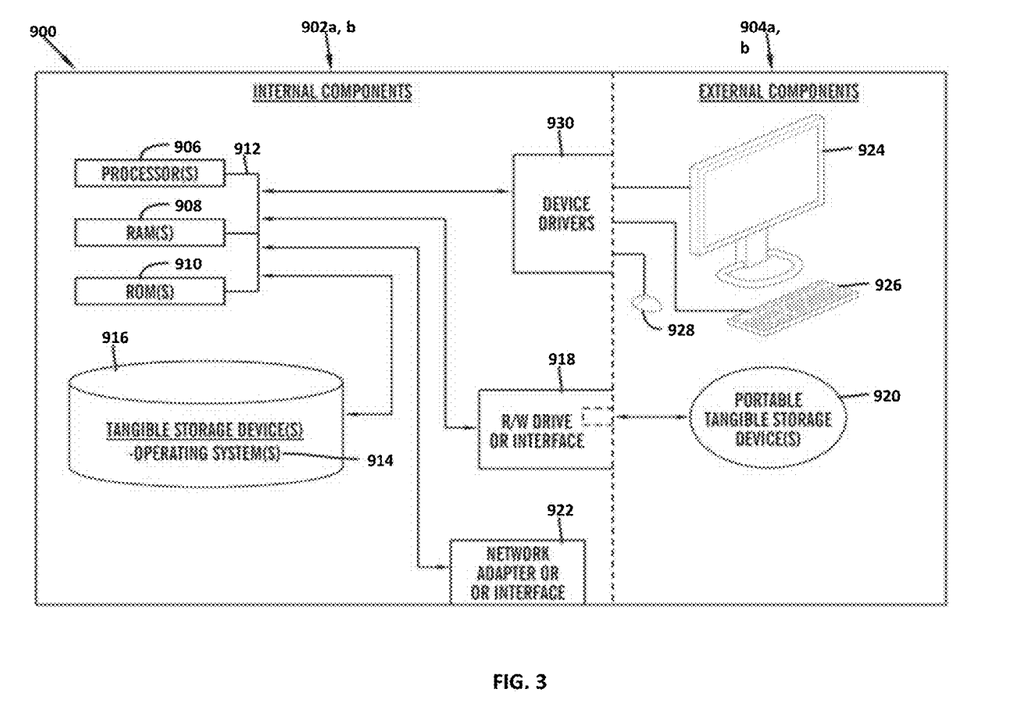
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the collaborative program 110a in client computer 102, and the collaborative program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the collaborative program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the collaborative program 110a in client computer 102 and the collaborative program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the collaborative program 110a in client computer 102 and the collaborative program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
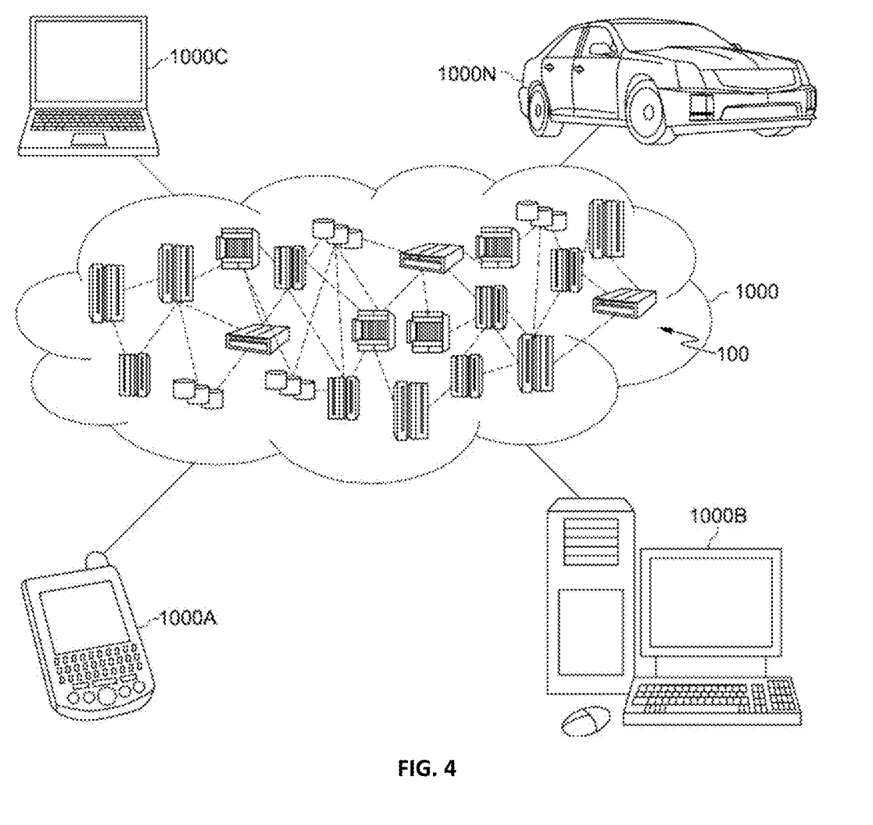
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
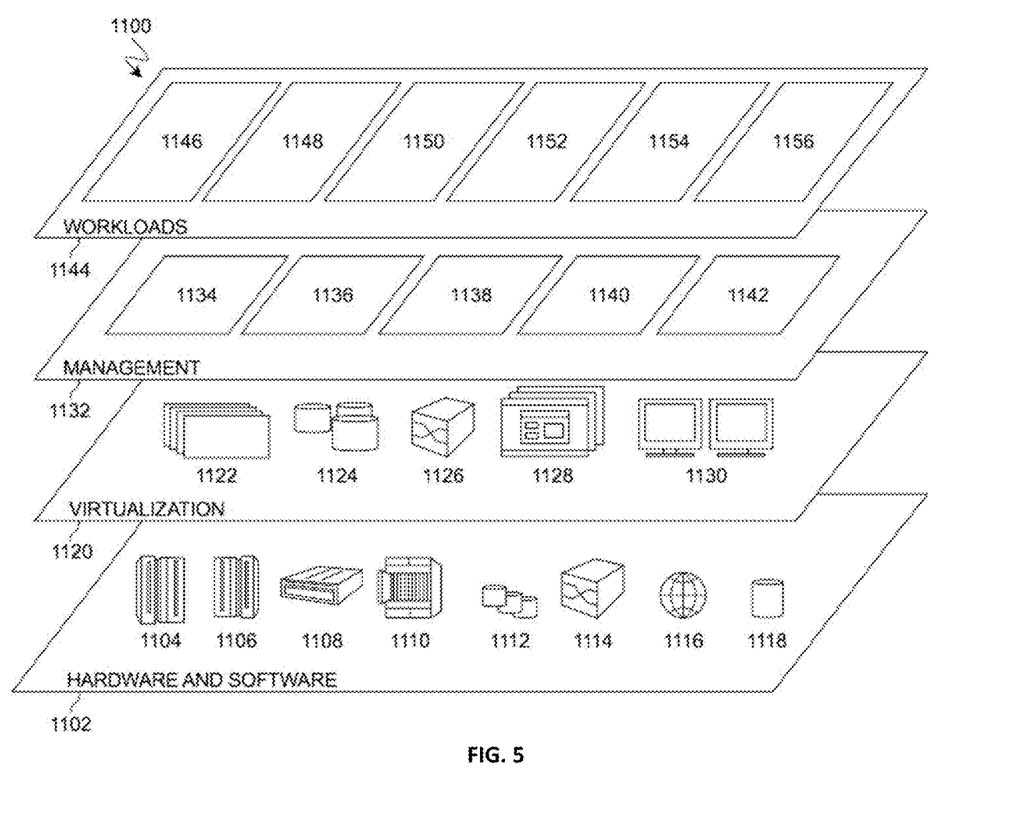
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and vehicle collaboration 1156. A collaboration program 110a, 110b provides a way to determine a structured movement path of vehicles (e.g., autonomous, non-autonomous) based on received data, additional data, and the historical data analysis (e.g., database 114).

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for vehicle collaboration, the method comprising:
    receiving data about a detection in a road and gathering additional data based on the received data;
    determining a comparative priority of one or more vehicles based on at least one or more of a vehicle type, a vehicle destination, and a participation history of the one or more vehicles, wherein the participation history includes at least a number of times each of the one or more vehicles participated in a protective layer;
    forming a protective layer using at least one available vehicle, wherein the at least one available vehicle is determined based on the comparative priority of the one or more vehicles, and wherein a number of necessary vehicles is determined using a machine learning model, wherein the machine learning model is trained using at least one or more of the received data, the additional data, and a historical data analysis;
    awarding an incentive to the user associated with the at least one available vehicle utilized in forming the protective layer;
    determining a structured movement path; and
    retraining the machine learning model based on an effectiveness of the structured movement path.

2. The method of claim 1, wherein the protective layer includes at least one secure lane, and wherein the secure lane is a lane in which a vehicle can travel without compromising speed.

3. The method of claim 1, further comprising:
ranking each of the one or more vehicles based on their comparative priority, wherein the at least one available vehicle utilized in forming the protective layer has a lowest comparative priority.

4. The method of claim 1, wherein determining the structured movement path further comprises:
identifying the at least one available vehicle with a lowest comparative priority; and
replacing a participating vehicle with the at least one available vehicle with the lowest comparative priority.

5. The method of claim 4, further comprising:
coordinating the structured movement path with the at least one available vehicle;
maintaining a secure lane; and
communicating the structured movement path to at least one approaching vehicle.

6. A computer system for vehicle collaboration, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving data about a detection in a road and gathering additional data based on the received data;
determining a comparative priority of one or more vehicles based on at least one or more of a vehicle type, a vehicle destination, and a participation history of the one or more vehicles, wherein the participation history includes at least a number of times each of the one or more vehicles participated in a protective layer;
forming a protective layer using at least one available vehicle, wherein the at least one available vehicle is determined based on the comparative priority of the one or more vehicles, and wherein a number of necessary vehicles is determined using a machine learning model, wherein the machine learning model is trained using at least one or more of the received data, the additional data, and a historical data analysis;
awarding an incentive to the user associated with the at least one available vehicle utilized in forming the protective layer;
determining a structured movement path; and
retraining the machine learning model based on an effectiveness of the structured movement path.

7. The computer system of claim 6, wherein the protective layer includes at least one secure lane, and wherein the secure lane is a lane in which a vehicle can travel without compromising speed.

8. The method of claim 1, further comprising:
ranking each of the one or more vehicles based on their comparative priority, wherein the at least one available vehicle utilized in forming the protective layer has a lowest comparative priority.

9. The computer system of claim 6, wherein determining the structured movement path further comprises:
identifying the at least one available vehicle with a lowest comparative priority; and
replacing a participating vehicle with the at least one available vehicle with the lowest comparative priority.

10. The computer system of claim 9, further comprising:
coordinating the structured movement path with the at least one available vehicle;
maintaining a secure lane; and
communicating the structured movement path to at least one approaching vehicle.

11. A computer program product for vehicle collaboration, comprising:
one or more non-transitory computer-readable storage media and program instructions stored on at least one of the one or more tangible storage media, the program instructions executable by a processor to cause the processor to perform a method comprising:
receiving data about a detection in a road and gathering additional data based on the received data;
determining a comparative priority of one or more vehicles based on at least one or more of a vehicle type, a vehicle destination, and a participation history of the one or more vehicles, wherein the participation history includes at least a number of times each of the one or more vehicles participated in a protective layer;
forming a protective layer using at least one available vehicle, wherein the at least one available vehicle is determined based on the comparative priority of the one or more vehicles, and wherein a number of necessary vehicles is determined using a machine learning model, wherein the machine learning model is trained using at least one or more of the received data, the additional data, and a historical data analysis;
awarding an incentive to the user associated with the at least one available vehicle utilized in forming the protective layer;
determining a structured movement path; and
retraining the machine learning model based on an effectiveness of the structured movement path.

12. The computer program product of claim 11, wherein the protective layer includes at least one secure lane, and wherein the secure lane is a lane in which a vehicle can travel without compromising speed.

13. The method of claim 1, further comprising:
ranking each of the one or more vehicles based on their comparative priority, wherein the at least one available vehicle utilized in forming the protective layer has a lowest comparative priority.

14. The computer program product of claim 11, wherein determining the structured movement path further comprises:
identifying the at least one available vehicle with a lowest comparative priority; and
replacing a participating vehicle with the at least one available vehicle with the lowest comparative priority.

15. The computer program product of claim 14, further comprising:
coordinating the structured movement path with the at least one available vehicle;
maintaining a secure lane; and
communicating the structured movement path to at least one approaching vehicle.

16. The method of claim 3, wherein a participation history of the user is stored in a database.

17. The method of claim 1, wherein the effectiveness of the structured movement path is assigned a numerical value based on a plurality of factors including one or more of a speed of vehicles in a secure lane, a time spent as part of the protective layer by each vehicle, and whether any motor vehicle incidents occurred during movement of the detection in the road, wherein the numerical value is stored for the historical data analysis and utilized in retraining the machine learning model for determining the number of necessary vehicles to be utilized in forming future protective layers.

18. The method of claim 1, wherein gathering additional data is performed after performing one or more of image processing, image recognition, word processing, and word recognition on the data received about the detection in the road.

19. The method of claim 1, further comprising:
determining a recommended approach to the detection in the road based on the received data and the additional data gathered based on the received data, wherein the received data includes images or video captured by a user using a mobile version of a collaboration program on an end user device, wherein the additional data includes at least one High Definition Map captured from an autonomous vehicle using one or more sensors of the autonomous vehicle;
identifying one or more previous similar detections after performing one or more of image processing, image recognition, word processing, and word recognition on the received data, the additional data, and the historical data analysis; and
sending one or more notifications to one or more approaching vehicles enrolled in the collaboration program based on a tracked location of the user, wherein the one or more notifications include the recommended approach to the detection in the road.

20. The method of claim 1, further comprising:
determining the number of necessary vehicles exceeds a number of available vehicles to form the protective layer; and
enlisting one or more additional vehicles, wherein the one or more additional vehicles includes autonomous vehicles or non-autonomous vehicles enrolled in a collaboration program, wherein the autonomous vehicles in the area of the detection with a low comparative priority are enlisted utilizing car-to-infrastructure communication, and wherein the non-autonomous vehicle users in the area of the detection are enlisted using alerts transmitted to a mobile version of the collaboration program.

* * * * *